(12) United States Patent
Beller et al.

(10) Patent No.: US 10,602,338 B2
(45) Date of Patent: Mar. 24, 2020

(54) EMERGENCY AUTHORIZATION TO ACCESS DATA ON PROXIMATE COMPUTING DEVICES

(71) Applicant: INTERNATIONAL BUSINESS MACHINES CORPORATION, Armonk, NY (US)

(72) Inventors: Charles E. Beller, Baltimore, MD (US); Gregory J. Boss, Saginaw, MI (US); Rick A. Hamilton, II, Charlottesville, VA (US); Jayashree Vaidyanathan, Cincinnati, OH (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 142 days.

(21) Appl. No.: 15/658,833

(22) Filed: Jul. 25, 2017

(65) Prior Publication Data

US 2019/0037370 A1     Jan. 31, 2019

(51) Int. Cl.

| | |
|---|---|
| *H04W 4/90* | (2018.01) |
| *H04W 4/02* | (2018.01) |
| *H04W 8/20* | (2009.01) |
| *H04W 48/16* | (2009.01) |
| *H04L 29/06* | (2006.01) |
| *H04W 12/08* | (2009.01) |
| *H04W 12/00* | (2009.01) |

(Continued)

(52) U.S. Cl.
CPC ............ *H04W 4/90* (2018.02); *H04L 63/107* (2013.01); *H04W 4/023* (2013.01); *H04W 8/20* (2013.01); *H04W 12/00503* (2019.01); *H04W 12/08* (2013.01); *H04W 12/0802* (2019.01); *H04W 48/16* (2013.01); *G06Q 50/265* (2013.01); *H04W 64/003* (2013.01)

(58) Field of Classification Search
CPC ......... H04W 4/90; H04W 4/023; H04W 8/20; H04W 12/08; H04W 48/16; H04L 63/107
See application file for complete search history.

(56) References Cited

U.S. PATENT DOCUMENTS 7,158,803 B1 * 1/2007 Elliott .................. H04W 72/10
                                                         455/512
9,071,807 B2   6/2015 Billau et al.
(Continued)

*Primary Examiner* — German Viana Di Prisco
(74) *Attorney, Agent, or Firm* — Jay Wahlquist; Andrew D. Wright; Roberts Mlotkowski Safran Cole & Calderon P.C.

(57) ABSTRACT

Devices and methods for accessing data on at least one proximate computing device in an emergency situation are disclosed. A method includes: determining that the emergency situation is occurring; in response to determining that the emergency situation is occurring: determining a location where the emergency situation is occurring and a location of the computing device; and determining the location where the emergency situation is occurring is within a first predetermined distance of the location of the computing device; and in response to determining that the location where the emergency situation is occurring is within the first predetermined distance of the location of the computing device: determining the at least one proximate computing device located within a second predetermined distance of the location of the computing device; and receiving access to at least part of the data on the at least one proximate computing device.

19 Claims, 4 Drawing Sheets

(51) Int. Cl.
*G06Q 50/26* (2012.01)
*H04W 64/00* (2009.01)

(56) References Cited

U.S. PATENT DOCUMENTS

| | | | |
|---|---|---|---|
| 9,191,632 B2 | 11/2015 | Billau et al. | |
| 2009/0055222 A1 | 2/2009 | Lorsch | |
| 2010/0262923 A1 | 10/2010 | Citrin et al. | |
| 2014/0122720 A1* | 5/2014 | Jung | H04L 41/5054 709/225 |
| 2014/0132764 A1* | 5/2014 | Billau | H04N 5/76 348/143 |
| 2014/0287723 A1 | 9/2014 | Lafever et al. | |
| 2014/0344846 A1* | 11/2014 | Yamamura | H04N 21/2396 725/25 |
| 2015/0213708 A1* | 7/2015 | Barzangi | G08B 25/016 455/404.2 |
| 2015/0327010 A1* | 11/2015 | Gottschalk | G06F 17/50 455/456.1 |
| 2016/0335879 A1 | 11/2016 | Carr | |

\* cited by examiner

EMERGENCY AUTHORIZATION TO ACCESS DATA ON PROXIMATE COMPUTING DEVICES

BACKGROUND

The present invention generally relates to computing devices and, more particularly, to a system and method for granting authorization to access data on proximate computing devices in an emergency.

During a natural or man-made disaster, an emergency response team may not have access to various types of data that may useful to the emergency response team to help them minimize loss of life and/or property during their response. For example, such useful data that emergency response teams may not have access to include: (1) cellular phone trace information that may indicate whether or not a person is in an emergency area and, if so, may be useful in locating the person; (2) information regarding building schematics that may be useful in the event of a fire, earthquake, flood, etc.; or (3) access to video feeds (e.g., closed-circuit television (CCTV), bank automated teller machine (ATM) cameras, etc.).

SUMMARY

In a first aspect of the invention, there is a method that includes: determining, by a computing device, that an emergency situation is occurring; in response to determining that the emergency situation is occurring: determining, by the computing device, a location where the emergency situation is occurring and a location of the computing device; and determining, by the computing device, the location where the emergency situation is occurring is within a first predetermined distance of the location of the computing device; and in response to determining that the location where the emergency situation is occurring is within the first predetermined distance of the location of the computing device: determining, by the computing device, the at least one proximate computing device located within a second predetermined distance of the location of the computing device; and receiving access to at least part of the data on the at least one proximate computing device, by the computing device.

In another aspect of the invention, there is a computer program product that includes a computer readable storage medium having program instructions embodied therewith. The program instructions are executable by a computing device to cause the computing device to: determine that an emergency situation is occurring; in response to determining that the emergency situation is occurring: determine a location where the emergency situation is occurring and a location of the computing device; and determine the location where the emergency situation is occurring is within a first predetermined distance of the location of the computing device; and in response to determining that the location where the emergency situation is occurring is within the first predetermined distance of the location of the computing device: determine at least one proximate computing device located within a second predetermined distance of the location of the computing device; and receive access to at least part of the data on the at least one proximate computing device.

In another aspect of the invention, there is a computing device that includes: at least one hardware processor; an emergency situation determiner configured to determine, using the at least one hardware processor, that an emergency situation is occurring; a location determiner configured to determine, using the at least one hardware processor, a location where the emergency situation is occurring and a location of the computing device; a proximity determiner configured to determine, using the at least one hardware processor, the location where the emergency situation is occurring, as determined by the location determiner, is within a first predetermined distance of the location of the computing device, as determined by the location determiner; a proximate device data accessor configured to, in response to the proximity determiner determining that the location where the emergency situation is occurring is within the first predetermined distance of the location of the computing device: determine, using the at least one hardware processor, at least one proximate computing device located within a second predetermined distance of the location of the computing device; and receive access, using the at least one hardware processor, to at least part of the data on the at least one proximate computing device based on the type of user associated with the computing device.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
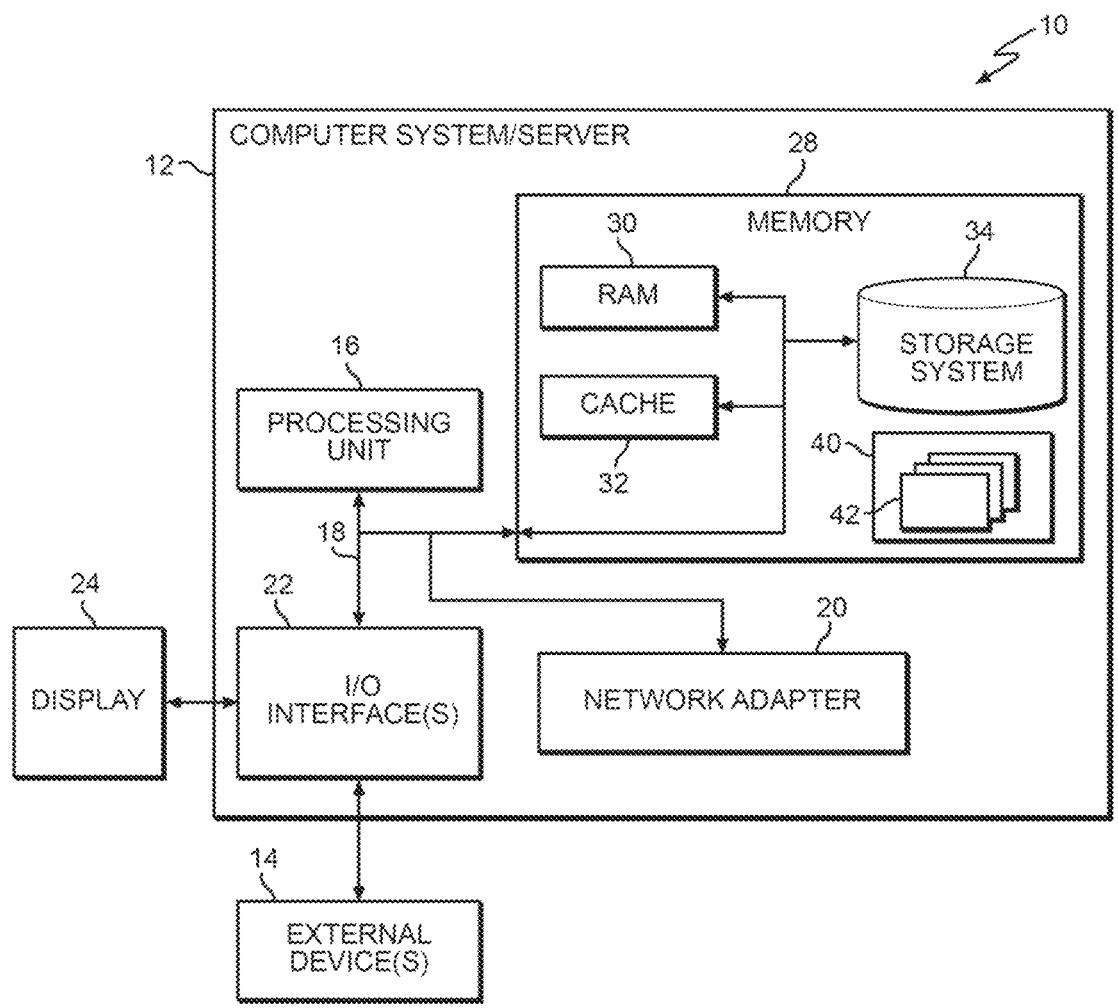
FIG. 1 depicts a computer system according to an embodiment of the present invention.

The present invention generally relates to computing devices and, more particularly, to a system and method for granting authorization to access data on proximate computing devices in an emergency. Aspects of the invention are directed to authorizing tiered access to data on other computing devices based on proximity of a computing device to the other computing devices as well as situational factors, including a severity of the emergency and a type of user of the computing device. The data on the other computing devices that is being accessed may be anonymized. Other aspects of the invention are directed to determining whether there is a benefit associated with deanonymizing the data on the other computing devices that is being accessed and, if so, deanonymizing the aforementioned data.

As described herein, aspects of the invention may include determining that an emergency situation is occurring, as well as a location where the emergency situation is occurring and a location of the computing device. In the event that the location where the emergency situation is occurring is within a predetermined distance of the location of the computing device, one or more other computing devices located within a predetermined proximity of the computing device may be identified, and access to at least part of the data on the other computing devices may be provided to the computing device.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

According to an embodiment, computer system 12 may be a mobile device such as a cellular phone, tablet, personal digital assistant (PDA), laptop computer, or any other mobile computing device. Alternatively, computer system 12 may be a desktop computer or automobile computer system. Computer system 12 may be used by an emergency responder such as a public safety officer, fireman, emergency medical technician (EMT), or any other person that is tasked with responding to emergency situations. Alternatively, computer system 12 may be used by a non-emergency responder, including any individual who is not tasked with responding to emergency situations.

Figure 2:
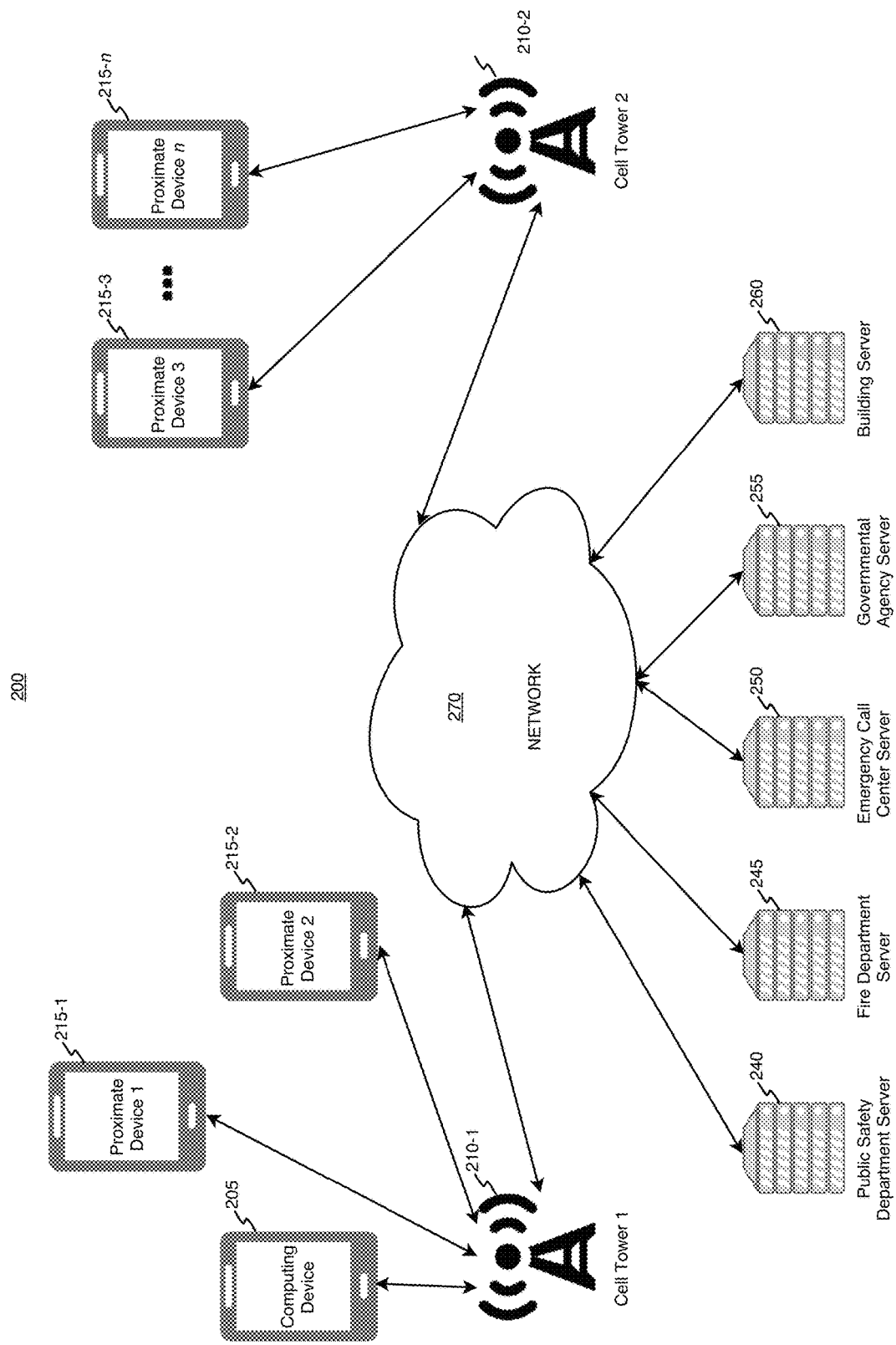
FIG. 2 depicts an illustrative environment according to an embodiment of the present invention.

FIG. 2 depicts an illustrative environment 200 according to an embodiment of the present invention. As shown, environment 200 comprises a computing device 205, which may be a computer system 12 as shown in FIG. 1. The computing device 205 may be used by an emergency responder such as a public safety officer, fireman, EMT, or any other person that is tasked with responding to emergency situations. Alternatively, the computing device 205 may be used by a non-emergency responder, including any individual who is not tasked with responding to emergency situations. The computing device 205 may be a mobile device such as a cellular phone, tablet, PDA, laptop computer, or any other mobile computing device. Alternatively, the computing device 205 may be a desktop computer, automobile computer system, or any other type of computing device. According to an embodiment, the computing device 205 may communicate over a cellular network with a first cellular tower 210-1 and may be in communication with a network 270 via the first cellular tower 210-1.

The environment 200 according to an embodiment may also include a first proximate computing device 215-1, a second proximate computing device 215-2, a third proximate computing device 215-3, and an n-th proximate computing device 215-n, which may be computer systems 12 as shown in FIG. 1. The first proximate computing device 215-1, the second proximate computing device 215-2, the third proximate computing device 215-3, and the n-th proximate computing device 215-n may be mobile devices such as cellular phones, tablets, PDAs, laptop computers, or any other mobile computing devices used by various individuals who may or may not be emergency responders. Alternatively, the first proximate computing device 215-1, the second proximate computing device 215-2, the third proximate computing device 215-3, and the n-th proximate computing device 215-n may be desktop computers, automobile computer systems, or any other type of computing device used by various individuals who may or may not be emergency responders.

According to an embodiment, the first proximate computing device 215-1 and the second proximate computing device 215-2 may communicate over the cellular network with the first cellular tower 210 and may be in communication with the network 270 via the first cellular tower 210-1. The third proximate computing device 215-3 and the n-th proximate computing device 215-n may communicate over the cellular network with a second cellular tower 210-2 and may be in communication with the network 270 via the second cellular tower 210-2.

The computing device 205 as well as one or more of the first proximate computing device 215-1, the second proximate computing device 215-2, the third proximate computing device 215-3, and the n-th proximate computing device 215-n may be in direct communication with each other in addition to being able to communicate with each other through the cellular network and/or the network 270. By way of a non-limiting example, the computing device 205 as well as one or more of the first proximate computing device 215-1, the second proximate computing device 215-2, the third proximate computing device 215-3, and the n-th proximate computing device 215-n may be able to directly communicate with each other through Wi-Fi, Bluetooth, or any other method.

The environment 200 according to an embodiment may also include one or more servers associated with a public safety department, a fire department, an emergency call center (e.g., 911 call center), a governmental agency, or a building, such as public safety department server 240, fire department server 245, emergency call center server 250, governmental agency server 255, and/or building server 260, which may be computer systems 12 as shown in FIG. 1. The one or more public safety department server 240, fire department server 245, emergency call center server 250, governmental agency server 255, and/or building server 260 may be in communication with the computing device 205 via network 270. Alternatively, the one or more public safety department server 240, fire department server 245, emergency call center server 250, governmental agency server 255, and/or building server 260 may be in direct communication with the computing device 205 through Wi-Fi, Bluetooth, or any other method.

Figure 3:
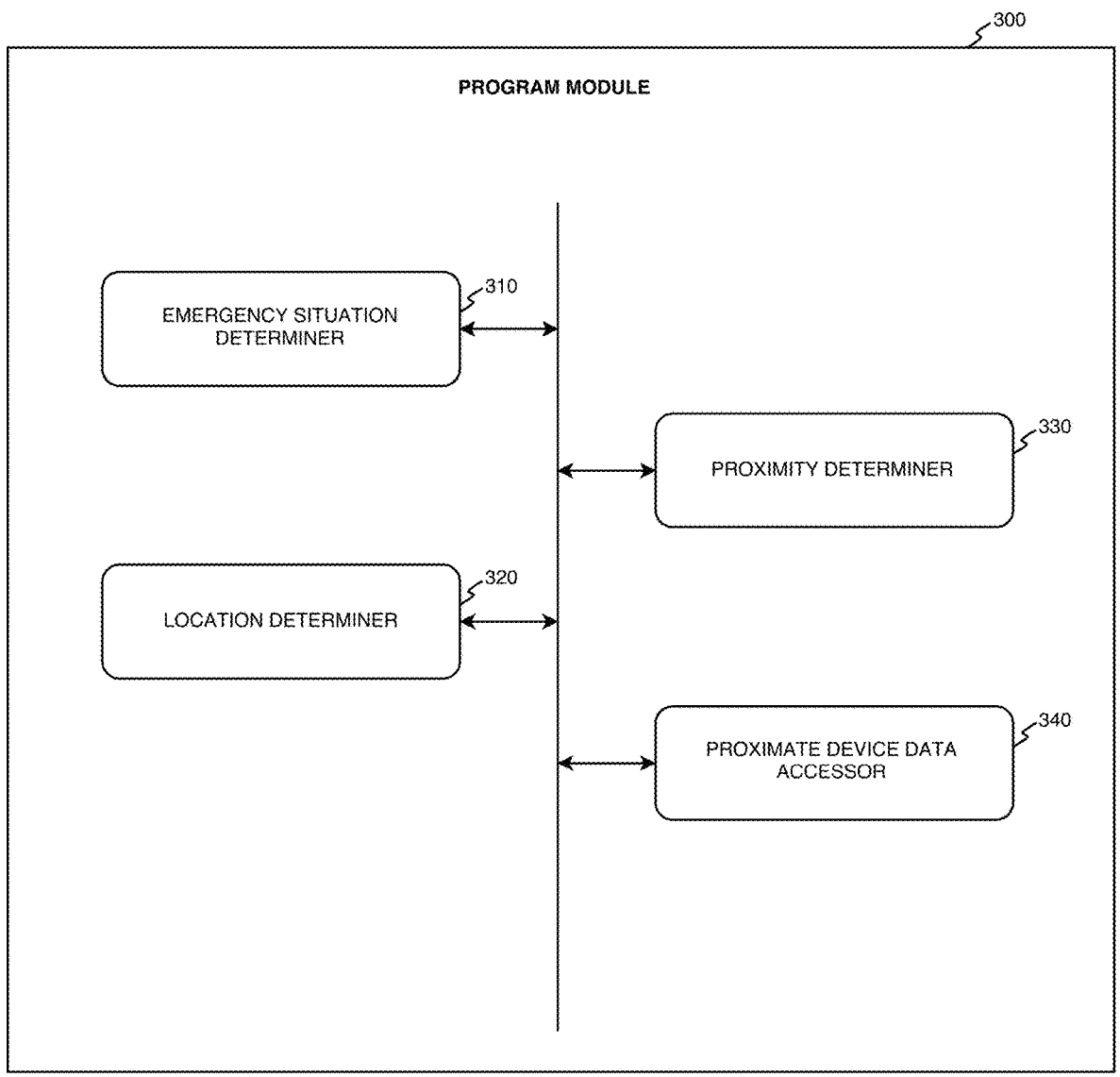
FIG. 3 shows a block diagram of an exemplary program module in accordance with aspects of the invention.

FIG. 3 shows a block diagram of an exemplary program module 300 in the computing device 205 in accordance with aspects of the invention. The computing device 205 may be a computer system 12 as shown in FIG. 1, and the program module 300 may be a program module 42 as shown in FIG. 1. According to aspects of the invention, the program module 300 may include an emergency situation determiner 310, a location determiner 320, a proximity determiner 330, and a proximate device data accessor 340.

The emergency situation determiner 310 of the program module 300 in the computing device 205 according to an embodiment may be configured to determine that an emergency situation is occurring. By way of a non-limiting example, the emergency situation determiner 310 may receive a push notification from the public safety department server 240, the fire department server 245, the emergency call center server 250, the governmental agency server 255, and/or the building server 260, indicating that an emergency situation is occurring. The notification may include a start time of the emergency situation, an end time of the emergency situation, a type of the emergency situation, a description of the emergency situation, and/or a location of the emergency situation. Additional information may also be provided with the emergency notification, such as photographs or other textual information.

According to another embodiment, the emergency situation determiner 310 may query one or more of the public safety department server 240, the fire department server 245, the emergency call center server 250, the governmental agency server 255, and/or the building server 260 to determine whether or not an emergency situation is occurring. If an emergency situation is occurring, the emergency situation determiner 310 may receive information including a start time of the emergency situation, an end time of the emergency situation, a type of the emergency situation, a description of the emergency situation, and/or a location of the emergency situation from one or more of the public safety department server 240, the fire department server 245, the emergency call center server 250, the governmental agency server 255, and/or the building server 260. Additional information may also be received, such as photographs or other textual information.

According to yet another embodiment, the emergency situation determiner 310 may receive a notification broadcast by another mobile device. By way of a non-limiting example, the emergency situation determiner 310 may receive a notification broadcast by a mobile device of an individual that indicates the existence of an emergency situation. The notification may be broadcast by the mobile device of the individual in response to the individual dialing an emergency telephone number (e.g., 911) on the mobile device, in response to a broadcast request sent by an emergency call center to the mobile device (e.g., after the individual contacts the emergency call center), and/or in response to a request by the user of the mobile device.

According to yet another embodiment, the emergency situation determiner 310 may receive a notification broadcast by a computing device associated with a building such as building server 260. By way of a non-limiting example, the emergency situation determiner 310 may receive a notification broadcast by a server associated with an office building in response to the activation of the office building's fire alarm system.

According to yet another embodiment, the emergency situation determiner 310 may receive a notification broadcast by a computing device associated with a public safety department, a fire department, an emergency call center (e.g., 911 call center), or a governmental agency (such as public safety department server 240, fire department server 245, emergency call center server 250, and/or governmental agency server 255), and/or one or more buildings (e.g., building server 260), indicating that an emergency situation is occurring.

The emergency situation determiner 310 may be configured to (1) receive push notifications as described above, (2) query one or more servers as described above, and/or (3)

receive broadcast notifications as described above. Based upon a received push notification, information received in response to querying one or more servers, and/or a received broadcast notification, the emergency situation determiner 310 may determine that an emergency situation is occurring.

Still referring to FIG. 3, the location determiner 320 may be configured to, in response to the emergency situation determiner 310 determining that an emergency situation is occurring, determine a location where the emergency situation is occurring. The location where the emergency situation is occurring may be determined based on information received in a push notification, information received in response to querying one or more servers, and/or a received broadcast notification.

Alternatively, the location determiner 320 may query one or more servers or computing devices, including a server or computing device associated with a public safety department, a fire department, an emergency call center (e.g., 911 call center), or a governmental agency (such as the public safety department server 240, the fire department server 245, the emergency call center server 250, and/or the governmental agency server 255), and/or a server or computing device associated with one or more buildings (e.g., building server 260) and receive information regarding a location where the emergency situation is occurring.

The location determiner 320 may also be configured to, in response to the emergency situation determiner 310 determining that an emergency situation is occurring, determine a location of the computing device 205. According to an embodiment, the location determiner 320 may use the global positioning system (GPS), cellular towers, and/or Wi-Fi networks to determine the location of the computing device 205.

With continued reference to FIG. 3, the proximity determiner 330 may be configured to, in response to the emergency situation determiner 310 determining that an emergency situation is occurring, determine whether or not the location where the emergency situation is occurring, as determined by the location determiner 320, is within a predetermined distance of the location of the computing device 205, as also determined by the location determiner 320.

According to an embodiment, the predetermined distance may be configured by a user of the computing device 205. By way of a non-limiting example, if the user of the computing device 205 is a public safety officer, the public safety officer may specify a particular distance as measured from the public safety officer's location. A public safety officer driving an automobile may specify a longer distance (e.g., 10 miles), while a public safety officer riding a bicycle may specify a shorter distance (e.g., 1 mile).

Alternatively, the predetermined distance may be set based upon a policy for a group of computing devices 205 associated with a particular set of first responders. By way of a non-limiting example, computing devices 205 associated with public safety officers at a particular public safety department may be set to use a predetermined distance of 3 miles.

Any other method may be used to set the predetermined distance. The predetermined distance may or may not be changeable by the user of the computing device 205.

According to another embodiment, instead of using a predetermined distance from the computing device 205, the proximity determiner 330 may determine whether or not the location where the emergency situation is occurring is within a predetermined distance of another location. By way of a non-limiting example, all devices associated with a particular public safety department may be configured to use a predetermined distance of 3 miles from the public safety department headquarters.

According to yet another embodiment, instead of using a predetermined distance, the proximity determiner 330 may determine whether or not the location where the emergency situation is occurring is within a predetermined boundary, such as a geo-boundary or a geo-fence. By way of a non-limiting example, all devices associated with a particular public safety department may be configured to use the public safety department service area boundary as the predetermined boundary.

The proximate device data accessor 340 may be configured to, in response to the proximity determiner 330 determining that the location where the emergency situation is occurring is within the predetermined distance, determine at least one proximate computing device (such as the first proximate computing device 215-1, the second proximate computing device 215-2, the third proximate computing device 215-3, and the n-th proximate computing device 215-$n$) located within a second predetermined distance of the location of the computing device 205 and receive access to at least part of the data on the at least one proximate computing device based on the type of user associated with the computing device 205.

According to an embodiment, the proximate device data accessor 340 may receive information from a cellular network, the Internet, or any other network regarding the at least one proximate computing device (such as the first proximate computing device 215-1, the second proximate computing device 215-2, the third proximate computing device 215-3, and the n-th proximate computing device 215-$n$) located within the second predetermined distance of the location of the computing device 205. The received information may include identifying information for the proximate computing device and/or the user associated with the proximate computing device, physical and/or network location information for the proximate computing device (e.g., GPS location information, information about a nearest cell tower, and/or another other information), and/or information required to access at least part of the data on the proximate computing device.

According to another embodiment, the proximate device data accessor 340 may receive information directly from the at least one proximate computing device (such as the first proximate computing device 215-1, the second proximate computing device 215-2, the third proximate computing device 215-3, and the n-th proximate computing device 215-$n$) located within the second predetermined distance of the location of the computing device 205 over a Bluetooth connection, Wi-Fi connection, or in any other manner. The received information may include identifying information for the proximate computing device and/or the user associated with the proximate computing device, physical and/or network location information for the proximate computing device (e.g., GPS location information, information about a nearest cell tower, and/or another other information), and/or information required to access at least part of the data on the proximate computing device.

According to an embodiment, authentication may be performed to verify an identity of the user of the computing device 205 and/or authorization to access data on the proximate computing devices (such as the first proximate computing device 215-1, the second proximate computing device 215-2, the third proximate computing device 215-3, and the n-th proximate computing device 215-$n$), before providing said access.

According to an embodiment, the proximate device data accessor 340 may receive access to all or part of the data on the proximate computing device (such as the first proximate computing device 215-1, the second proximate computing device 215-2, the third proximate computing device 215-3, and the n-th proximate computing device 215-*n*) using the information received from a cellular network, the Internet, or any other network regarding the at least one proximate computing device, or received directly from the proximate computing device. By way of a non-limiting example, the proximate device data accessor 340 may use the received information to query the proximate computing device, and the proximate computing device may respond to the query by providing access to part of the data on the proximate computing device.

Alternatively, according to another embodiment, the information received from a cellular network, the internet, or any other network regarding the at least one proximate computing device (such as the first proximate computing device 215-1, the second proximate computing device 215-2, the third proximate computing device 215-3, and the n-th proximate computing device 215-*n*), or received directly from the proximate computing device may include the part of the data on the proximate computing device.

The part of the data on the proximate computing device (such as the first proximate computing device 215-1, the second proximate computing device 215-2, the third proximate computing device 215-3, and the n-th proximate computing device 215-*n*) which the proximate device data accessor 340 makes accessible to the user of the computing device 205 may include photographs, video feeds, audio feeds, location information, cellular phone trace information, building schematics, medical information, and/or any other information stored in or accessible to the proximate computing device. The proximate device data accessor 340 may store the part of the data of the proximate computing device on the computing device 205 and/or any local or remote storage device accessible to the computing device 205.

The part of the data on the proximate computing device (such as the first proximate computing device 215-1, the second proximate computing device 215-2, the third proximate computing device 215-3, and the n-th proximate computing device 215-*n*) which the proximate device data accessor 340 makes accessible to the user of the computing device 205 may be anonymized by or caused to be anonymized by the proximate device data accessor 340. By way of a non-limiting example, faces and/or vehicle license plates may be obscured in photographs and video feeds. Additionally, personal and/or confidential information, such as medical information, may be partially or completely redacted or filtered.

According to an embodiment, the part of the data that the proximate device data accessor 340 makes accessible to the user of the computing device 205 may be determined based on a type of the user associated with the computing device 205. Thus, tiered access to the data of proximate devices may be provided, based upon the type of the user associated with the computing device 205 and the severity of the emergency situation.

By way of a non-limiting example, as shown in the table below, if the type of the user associated with the computing device 205 is an on-duty emergency responder (e.g., an EMT), a relatively higher level of access may be granted, allowing for more data to be accessed. If the type of user associated with the computing device 205 is an off-duty emergency responder, that user may be permitted a relatively lower level of access as compared to an on-duty emergency responder but a relatively higher level of access as compared to a non-emergency responder. If the type of user associated with the computing device 205 is a non-emergency responder (e.g., a bystander who is offering assistance), a relatively lower level of access may be granted, allowing for less data to be accessed. By way of a non-limiting example, an EMT may be granted access to an individual's complete health history, while a bystander who is offering assistance may only be granted access to information identifying the individual as a diabetic.

|  | Active bystander | Off duty professional | On-duty professional |
| --- | --- | --- | --- |
| Mild emergency | No access | Minimal access | Moderate access |
| Moderate emergency | Minimal access | Moderate access | Full access |
| Severe emergency | Moderate access | Full access | Full access |

The proximate device data accessor 340 according to an embodiment may determine whether or not a user of a proximate device (such as the first proximate computing device 215-1, the second proximate computing device 215-2, the third proximate computing device 215-3, and the n-th proximate computing device 215-*n*) and/or another individual or group of individuals would benefit (e.g., though an improved emergency response) from the deanonymization of the anonymized data from the proximate device, or if the user of the computing device 205 is otherwise authorized to access deanonymized data from the proximate device. By way of a non-limiting example, the proximate device data accessor 340 may determine that a proximate device user who is suffering from a medical emergency may benefit from the deanonymization of anonymized medical data and may therefore provide deanonymized medical data to the responding EMT.

According to an embodiment, the at least part of the data to which the user of the computing device 205 gains access may be determined based on a severity of the emergency situation. By way of a non-limiting example, if the emergency situation is an automobile crash that does not involve injuries, a public safety officer using the computing device 205 may only receive access to the names of the owners of the proximate computing devices (such as the first proximate computing device 215-1, the second proximate computing device 215-2, the third proximate computing device 215-3, and the n-th proximate computing device 215-*n*). However, if the emergency situation is an automobile crash that involves serious injuries, a public safety officer using the computing device 205 may receive access to medical information of the owners of the proximate computing devices.

According to an embodiment, the emergency situation determiner 310 may determine that the emergency situation is no longer occurring by (1) receiving a push notification as described above, (2) querying one or more servers as described above, and/or (3) receiving a broadcast notification as described above. In response to the emergency situation determiner 310 determining that the emergency situation is no longer occurring, the proximate device data accessor 340 may revoke access of the computing device 205 to the at least part of the data on the at least one proximate computing device (such as the first proximate computing device 215-1, the second proximate computing device 215-2, the third proximate computing device 215-3, and the n-th proximate computing device 215-*n*). Additionally, according to an embodiment, the proximate device data accessor 340 may delete the at least part of the data of the proximate computing device that is stored on the computing device 205.

Figure 4:
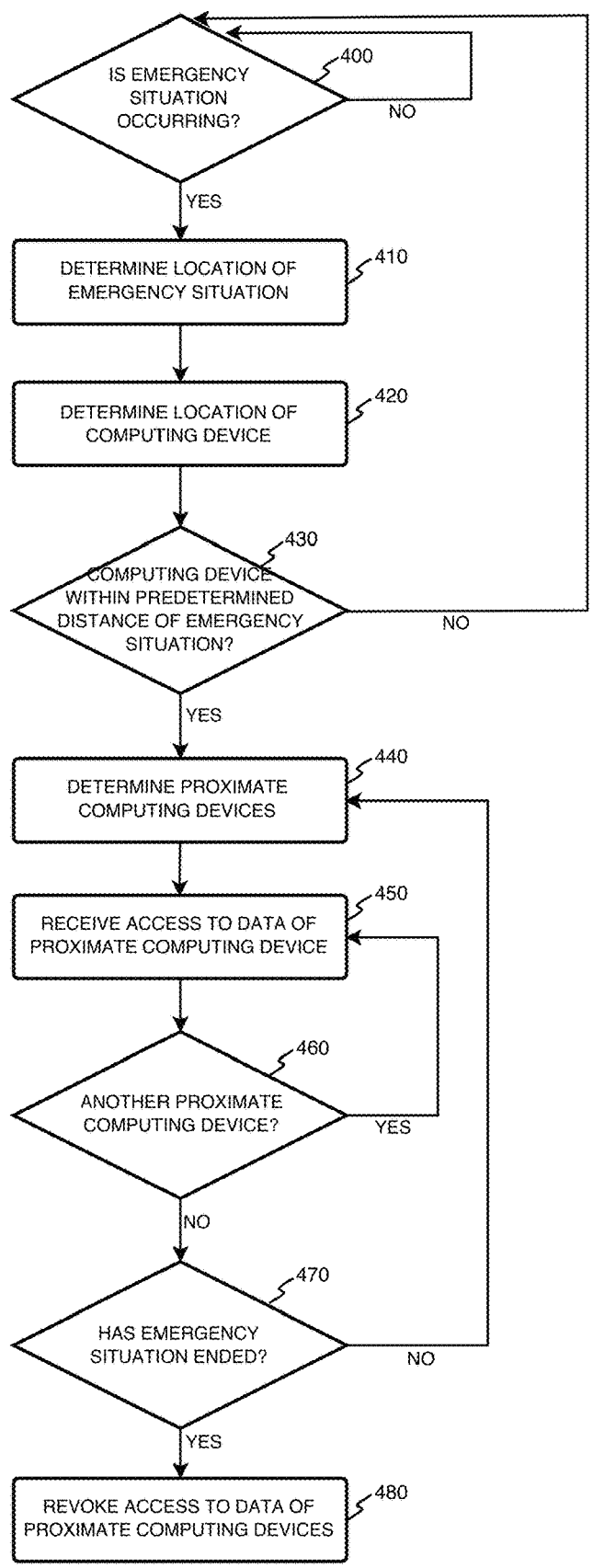
FIG. 4 depicts exemplary methods in accordance with aspects of the invention.

FIG. 4 depicts exemplary methods in accordance with aspects of the invention. The steps of the method may be performed in the computer system of FIG. 1, the environment of FIG. 2, and the program module of FIG. 3 and are described with reference to the elements and steps described with respect to FIGS. 1, 2, and 3.

At step 400, the system determines whether or not an emergency situation is occurring. In embodiments, as described with respect to FIG. 3, step 400 may be performed by the emergency situation determiner 310 of the program module 300 running on the computing device 205. If it is determined in step 400 that the emergency situation is not occurring, the flow returns to step 400. On the other hand, if it is determined that the emergency situation is occurring, the flow proceeds to step 410.

At step 410, the system determines a location of the emergency situation. In embodiments, as described with respect to FIG. 3, step 410 may be performed by the location determiner 320 of the program module 300 running on the computing device 205.

At step 420, the system determines a location of the computing device 205. In embodiments, as described with respect to FIG. 3, step 420 may be performed by the location determiner 320 of the program module 300 running on the computing device 205.

At step 430, the system determiners whether or not the location of the computing device 205 as determined in step 420 is within a predetermined distance of the location of the emergency situation as determined in step 410. In embodiments, as described with respect to FIG. 3, step 430 may be performed by the location determiner 320 of the program module 300 running on the computing device 205. If it is determined in step 430 that the location of the computing device 205 is not within the predetermined distance of the location of the emergency situation, the flow returns to step 400. On the other hand, if it is determined in step 430 that the location of the computing device 205 is within the predetermined distance of the location of the emergency situation, the flow proceeds to step 440.

At step 440, the system determines one or more proximate computing devices (such as the first proximate computing device 215-1, the second proximate computing device 215-2, the third proximate computing device 215-3, and the n-th proximate computing device 215-*n*) that are within a predetermined distance of the location of the computing device 205 as determined in step 420. In embodiments, as described with respect to FIG. 3, step 440 may be performed by the proximity determiner 330 of the program module 300 running on the computing device 205.

At step 450, the system receives access to at least part of the data on the one or more proximate computing devices (such as the first proximate computing device 215-1, the second proximate computing device 215-2, the third proximate computing device 215-3, and the n-th proximate computing device 215-*n*), as determined in step 440. In embodiments, as described with respect to FIG. 3, step 450 may be performed by the proximate device data accessor 340 of the program module 300 running on the computing device 205.

At step 460, the system determines whether or not there is another proximate computing device that has not yet been accessed. In embodiments, as described with respect to FIG. 3, step 440 may be performed by the proximity determiner 330 of the program module 300 running on the computing device 205. If it is determined in step 460 there is another proximate computing device that has not yet been accessed, the flow returns to step 450. On the other hand, if it is determined in step 460 that there is not another proximate computing device that has not yet been accessed, the flow proceeds to step 470.

At step 470, the system determines whether or not the emergency situation has ended. In embodiments, as described with respect to FIG. 3, step 470 may be performed by the emergency situation determiner 310 of the program module 300 running on the computing device 205. If it is determined in step 470 there the emergency situation has not ended, the flow returns to step 440. On the other hand, if it is determined in step 470 that the emergency situation has ended, the flow proceeds to step 480.

At step 480, the system revokes access to the at least part of the data on the one or more proximate computing devices. In embodiments, as described with respect to FIG. 3, step 480 may be performed by the proximate device data accessor 340 of the program module 300 running on the computing device 205.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for accessing data on at least one proximate computing device in an emergency situation, the method comprising:
   receiving an emergency situation notification, by a computing device, that the emergency situation is occurring;

in response to the received emergency situation notification that the emergency situation is occurring, determining, by the computing device, based on a received location notification, a location where the emergency situation is occurring and a location of the computing device;

determining, by the computing device, based on the received location notification, the location where the emergency situation is occurring is within a first predetermined distance of the location of the computing device; and in response to determining that the location where the emergency situation is occurring is within the first predetermined distance of the location of the computing device:

determining, by the computing device, based on a received second location notification, that at least one proximate computing device is located within a second predetermined distance of the location of the computing device; and receiving access, based on a received authorization, to at least part of the data on the at least one proximate computing device, by the computing device;

storing the at least part of the data, received from the at least one proximate computing device, in the computing device;

determining, based on a received notification of an end time of the emergency situation, that the emergency situation is no longer occurring; and in response to determining that the emergency situation is no longer occurring, deleting, by the computing device, the at least part of the data, received from the at least one proximate computing device, which was stored in the computing device.

2. The method according to claim 1, further comprising determining, based on a received notification, a type of user associated with the computing device, and wherein the at least part of the data is determined based on the type of user associated with the computing device.

3. The method according to claim 1, further comprising determining based on a received notification, a severity of the emergency situation, and wherein the at least part of the data is determined based on the determined severity of the emergency situation.

4. The method according to claim 1, wherein the at least part of the data comprises a video feed.

5. The method according to claim 1, wherein the at least part of the data comprises a building schematic.

6. The method according to claim 1, wherein the at least part of the data is anonymized by at least one selected from a group consisting of: obscuring a portion of the data; redacting a portion of the data; and filtering the data.

7. The method according to claim 6, further comprising:
determining that a user of the computing device is authorized to access deanonymized data;

in response to determining that the user of the computing device is authorized to access the deanonymized data, deanonymizing the at least part of the data.

8. The method of claim 1, wherein the emergency situation notification is received from at least one of a group consisting of: a public safety department; a fire department; an emergency call center; and a governmental agency.

9. The method of claim 8, wherein the location notification is received from at least one of a group consisting of: a Global positioning system (GPS); cellular towers; and a Wi-Fi network.

10. A computer program product comprising a computer readable hardware storage device having program instructions embodied therewith, the program instructions executable by a computing device to cause the computing device to:

receive an emergency situation notification that an emergency situation is occurring;

in response to receiving the emergency situation notification that the emergency situation is occurring, determine, based on a received location notification, a location where the emergency situation is occurring and a location of the computing device;

determine, based on the received location notification, the location where the emergency situation is occurring is within a first predetermined distance of the location of the computing device; and in response to determining that the location where the emergency situation is occurring is within the first predetermined distance of the location of the computing device:

determine, based on a received second location notification, that at least one proximate computing device is located within a second predetermined distance of the location of the computing device; and receive access, based on a received authorization, to at least part of the data on the at least one proximate computing device, wherein the receiving access to the at least part of the data comprises receiving and storing the at least part of the data, received from the at least one proximate computing device, on the computing device, and wherein the program instructions further cause the computing device to:

determine, based on a received notification of an end time of the emergency situation, that the emergency situation is no longer occurring; and in response to determining that the emergency situation is no longer occurring, delete, by the computing device, the at least part of the data, received from the at least one proximate computing device, which was stored on the computing device.

11. The computer program product according to claim 10, wherein the receiving the access to the at least part of the data is based on a type of user associated with the computing device, based on a received notification.

12. The computer program product according to claim 11, the program instructions further causing the computing device to:

determine, based on the received notification, whether the type of user associated with the computing device is an emergency responder type or a non-emergency responder type, wherein, in response to determining that the type of user is the emergency responder type, a relatively greater level of access to the at least part of the data is received, and wherein, in response to determining that the type of user is the non-emergency responder type, a relatively lesser level of access to the at least part of the data is received.

13. The computer program product according to claim 10, the program instructions further causing the computing device to determine, based on a received notification, a severity of the emergency situation, and wherein the at least part of the data is determined based on the determined severity of the emergency situation.

14. The computer program product according to claim 10, the program instructions further causing the computing device to:
in response to determining that the emergency situation is no longer occurring, revoking access of the computing device to the at least part of the data on the at least one proximate computing device.

15. The computer program product according to claim 10, wherein the at least part of the data is anonymized by at least one selected from a group consisting of:
obscuring a portion of the data; redacting a portion of the data; and filtering the data.

16. The computer program product according to claim 15, the program instructions further causing the computing device to:
determine, based on a received notification, that a user of the computing device is authorized to access deanonymized data;
in response to determining that the user of the computing device is authorized to access the deanonymized data, deanonymize the at least part of the data.

17. A computing device comprising:
at least one hardware processor;
program instructions to determine, based on a received emergency situation notification, using the at least one hardware processor, that an emergency situation is occurring;
program instructions to determine, based on a received location notification, using the at least one hardware processor, a location where the emergency situation is occurring and a location of the computing device;
program instructions to determine, based on the received location notification, using the at least one hardware processor, the location where the emergency situation is occurring is within a first predetermined distance of the location of the computing device, as determined by the location determiner;
program instructions to, in response to determining that the location where the emergency situation is occurring is within the first predetermined distance of the location of the computing device:
determine, based on a received second location notification, using the at least one hardware processor, that at least one proximate computing device is located within a second predetermined distance of the location of the computing device; and
receive access, based on a received authorization, using the at least one hardware processor, to at least part of the data on the at least one proximate computing device based on the type of user associated with the computing device,
program instruction to store the at least part of the data, received from the at least one proximate computing device, in the computing device;
program instructions to determine, based on a received notification of an end time of the emergency situation, that the emergency situation is no longer occurring; and
program instructions to, in response to determining that the emergency situation is no longer occurring, delete the at least part of the data, received from the at least one proximate computing device, which was stored in the computing device.

18. The computing device according to claim 17, further comprising:
program instructions to determine, based on a received notification, a type of user associated with the computing device; and
program instructions to determine the at least part of the data based on the determined type of user associated with the computing device.

19. The computing device according to claim 17, further comprising program instructions to anonymize the at least part of the data by at least one selected from a group consisting of: obscuring a portion of the data; redacting a portion of the data; and filtering the data.

* * * * *